United States Patent [19]

Amiand et al.

[11] Patent Number: 5,480,108
[45] Date of Patent: Jan. 2, 1996

[54] HARPOON HEADS AND HARPOONS PROVIDED WITH SUCH HEADS FOR THE ANCHORING OF HELICOPTERS TO PLATFORMS

[75] Inventors: Vincent J. Amiand, Angouleme; Francis D. Le Blanc; Paul R. Borghetti, both of Ruelle, all of France

[73] Assignee: Etat Francais as represented by the Delegue General pour l'Armement, Paris, France

[21] Appl. No.: 194,093

[22] Filed: Feb. 8, 1994

[30] Foreign Application Priority Data

Feb. 19, 1993 [FR] France .................................. 93 01899

[51] Int. Cl.⁶ .................................. B64B 1/66; B64F 1/12
[52] U.S. Cl. ...................... 244/115; 294/93; 294/86.25
[58] Field of Search .................................. 244/17.17, 115, 244/116; 294/93, 94, 86.25, 82.08; 114/261, 262; 403/316, 325, 327

[56] References Cited

U.S. PATENT DOCUMENTS 3,430,305 3/1969 Geffner .................................. 294/82.28
3,502,286 3/1970 Warren .................................. 244/115
4,120,232 10/1978 Hoffman, Jr. .................................. 294/82.28
4,863,205 9/1989 Schron et al. .................................. 294/94
5,039,034 8/1991 Burgess et al. .................................. 244/115
5,190,334 3/1993 Sawdon .................................. 294/94

*Primary Examiner*—Galen L. Barefoot
*Attorney, Agent, or Firm*—Oliff & Berridge

[57] ABSTRACT

An anchoring system using a harpoon secured under a helicopter and a grid on a platform includes a shaft, having near its end, fingers oriented and movable radially between a retracted position and an extended position. The shaft includes a device for moving and retaining the fingers in the extended position. The device acts from a state activated in response to the penetration into the grid. It furthermore includes structure for unlocking the fingers and resetting the moving and retaining device. Harpoons including such catching heads, which have the advantage of being light and simple in construction, and capable of being adaptable to all types of helicopters are also contemplated.

8 Claims, 6 Drawing Sheets

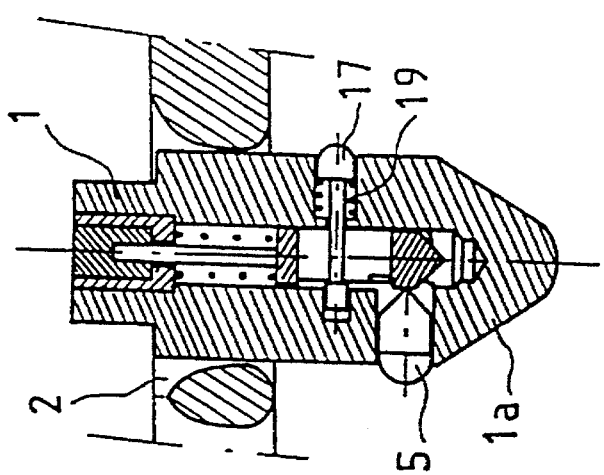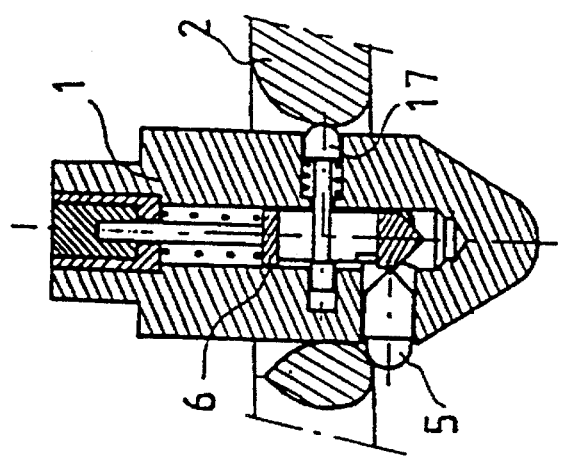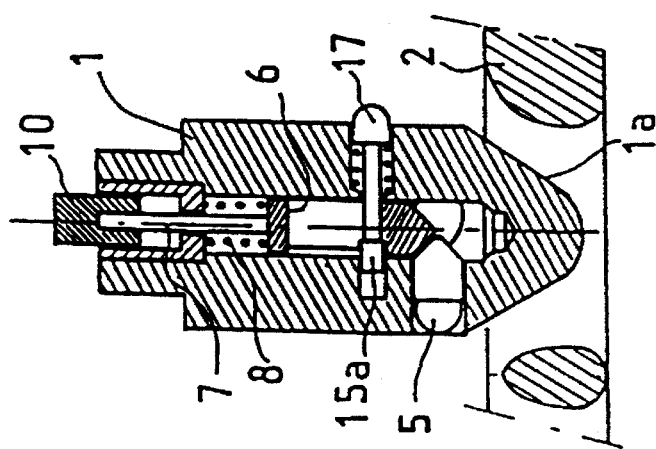

1

HARPOON HEADS AND HARPOONS PROVIDED WITH SUCH HEADS FOR THE ANCHORING OF HELICOPTERS TO PLATFORMS

BACKGROUND OF THE INVENTION

The present invention concerns an anchoring system using a harpoon and a grid for securing a vertical take-off and landing aircraft to a platform and more particularly, to, the head of the harpoon in such a system, as well as the harpoons provided with this head.

Harpoon and grid securing systems are of great significance for helicopters that must land on or take off from moving areas, such as ship decks, oil platforms, and even solid ground in zones exposed to violent winds. The significance of these systems is that the helicopter is anchored to a platform, and therefore stabilized, without delay and in an automatic manner. Similarly, the helicopter is released without external human assistance at the last moment before take-off. These systems comprise a grid mounted in the landing/take-off platform, defining cells with open bottoms, delimited by bridges or isthmuses. The harpoon is mounted underneath the helicopter and substantially comprises a retractable arm and, at the end of the arm, a head for catching in the grid.

In the known forms, if the grid is satisfactory overall, improvements can still be made with respect to the harpoons, which are generally heavy, bulky and complex systems, with respect both to their structure and their operation. Since the mechanical, hydraulic and electrical interfaces are large, the harpoons cannot be simply installed on a helicopter if this was not initially intended by the manufacturer.

The head includes a clamp, the jaws of which close around an isthmus between two cells. Apart from the fact that it is quite bulky, it is, in itself, relatively complex, using hydraulic and electrical means for its operation. Furthermore, on catching, the retention force that it transmits onto the grid, if significant, can be damaging to the grid since it is applied to a single isthmus.

SUMMARY OF THE INVENTION

An object of the invention is to provide a new harpoon head, that is simple in structure and in operation and adaptable to different types of harpoon arms, with just minor modifications.

Another object is to provide light harpoons provided with the head, capable of being easily fitted to all types of vertical take-off and landing aircraft, at a reasonable cost, to enable the equipping of light helicopters and nevertheless capable of performing all the functions of more sophisticated harpoons, notably the positioning of the aircraft.

A harpoon head according to the invention includes a cylindrical shaft with convex end, having, in addition to the end, fingers that are directed and movable radially between a retracted position inside the shaft and an extended position, a device for moving and retaining the fingers in the extended position, acting from a state activated in response to the penetration of the shaft into a cell of the grid, after which the fingers are brought under the level of the isthmuses of the grid delimiting the cell, and a device for releasing the fingers and reactivating the device for moving and retaining.

The retaining fingers are preferably advantageously three in number. They are clearly located in the same transverse plane, with an angular offset of 120°. It can thus be seen that, if the head transmits a significant force onto the grid, this force is distributed over the periphery of the cell in which the shaft is engaged.

According to another characteristic of the invention, the device for moving and retaining the fingers is activated by a trigger system, which is released by a release device located above the fingers on the shaft, and is sensitive to the passage into the cell. In practice, it acts on a dog engaged in a radial hole in the shaft and is brought into the partially extended position by a spring. When the shaft passes into a cell, the dog is forced towards the inside and, in so doing, activates the trigger system.

In yet another aspect of the invention, the device means for moving and retaining the fingers includes a rod mounted for sliding into an axial bore of the shaft into which open the radial holes in which the fingers are engaged. The rod cooperates, by means of its lower end, with the internal ends of the fingers. These ends of the rod and of the fingers are conical: in the top position of the rod, the bore is reduced at the level of the fingers, such that their ends can freely penetrate therein when they return into the shaft. When the rod descends, its lower end gradually advances the ends of the fingers by means of its conical part, the fingers then being in the extended position.

The rod is therefore activated when it is in the top position. It moves the fingers into the extended position and maintains them there by descending. One of the descending or ascending movements of the rod is advantageously provided by means of a return spring.

In a simple form, the other movement results from traction on the rod exerted by mechanical means. The harpoon head, which is entirely mechanical, is thus very easily adaptable, even to the harpoons of the prior art, designed with another type of head. As a variant, the other movement of the rod can be obtained by pneumatic means.

The invention also concerns light harpoons having a catching head, as defined above. Since they involve pneumatically-controlled harpoons, the arm and the head form a cohesive functional assembly: the arm is a pneumatic jack, and the head is located at the end of the rod of the jack. In the head, the locking of the fingers in the extended position, and indeed their releasing, are controlled in a pneumatic manner.

In an alternative embodiment, the upper end of the inner rod in the shaft, cooperating with the internal ends of the fingers, is integral with a piston. This moves in a chamber communicating with the upper chamber of the jack. When the jack is extended, the piston is subjected to pressure. Consequently, when the shaft engages in a cell, the trigger retaining the rod in the activated position is released, and the pressure makes the rod descend, against the force of a return spring. When the pressure is disengaged in the upper chamber of the jack, the spring makes the rod ascend again to the top position in which it is again locked by the trigger. Similarly, the jack forming the arm is retracted by a return spring.

When the jack is in the extended position, a positioning force can be created by pressurizing the lower chamber of the jack to a pressure greater than that in the upper chamber.

In another variant embodiment, it is the rising of the locking rod for the fingers that is provided by pneumatic means. In this case, an air intake is provided at the level of the shaft. As before, the extension of the arm may be pneumatic, against a return spring which returns the arm, or inversely.

BRIEF DESCRIPTION OF THE DRAWINGS

A better understanding of these characteristics and advantages, together with others, can be gained from the following description, provided with reference to the attached drawings, in which:

FIGS. 4a to 4c are diagrammatic views in axial section illustrating the successive operating phases of a head similar to that in FIGS. 1 and 2, FIGS. 5 and 6 are diagrammatic views in axial section of a harpoon provided with a first variant of the catching head according to the invention, showing it in the at rest position and in the catching position respectively.

DETAILED DESCRIPTION OF PREFERRED EMBODIMENTS

Figure 1:
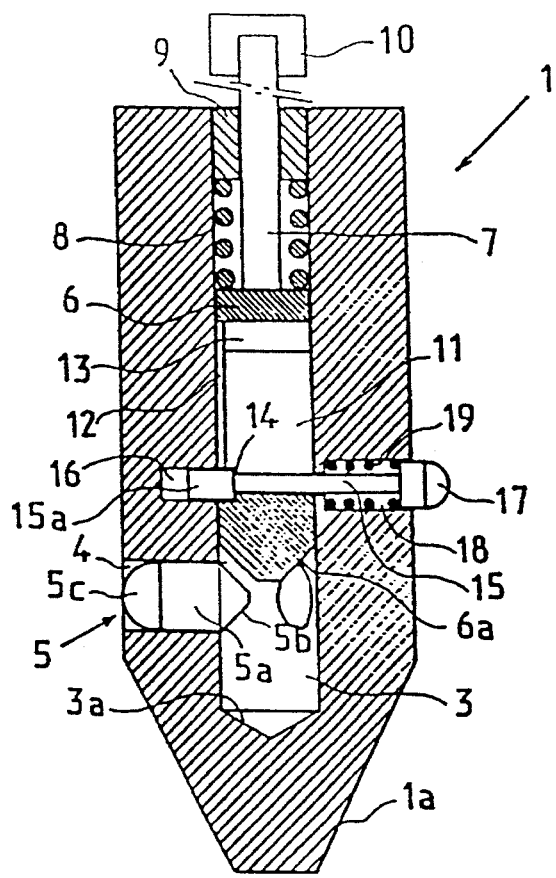
FIGS. 1 and 2 are views in axial section of a harpoon head according to the invention, illustrating respectively its state at rest, its fingers being in the returned position, and its state on catching in a grid, its fingers being in the extended position.

In all the drawings, the same reference numerals have been used throughout to designate the same elements.

Figure 5:
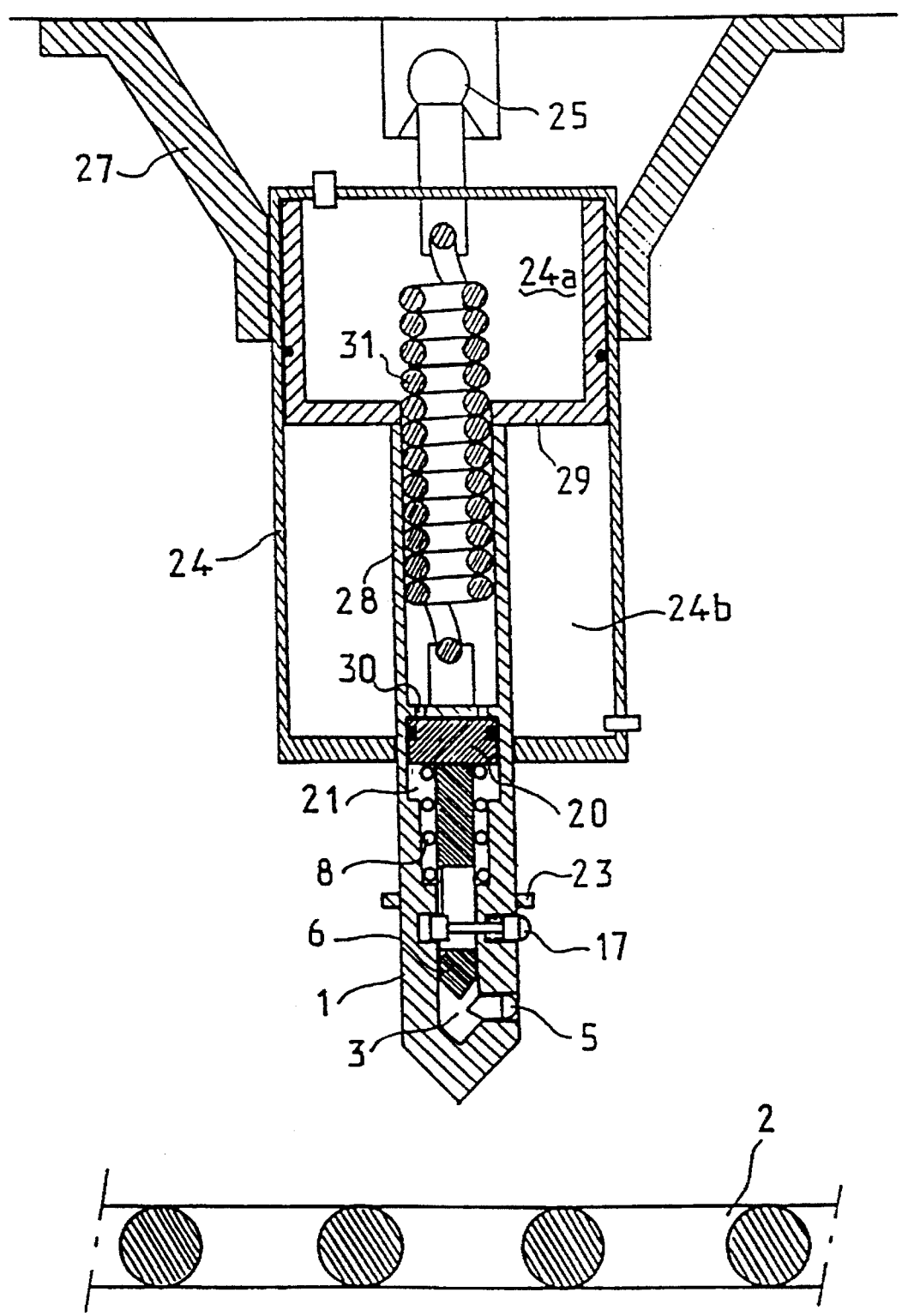
Figure 6:
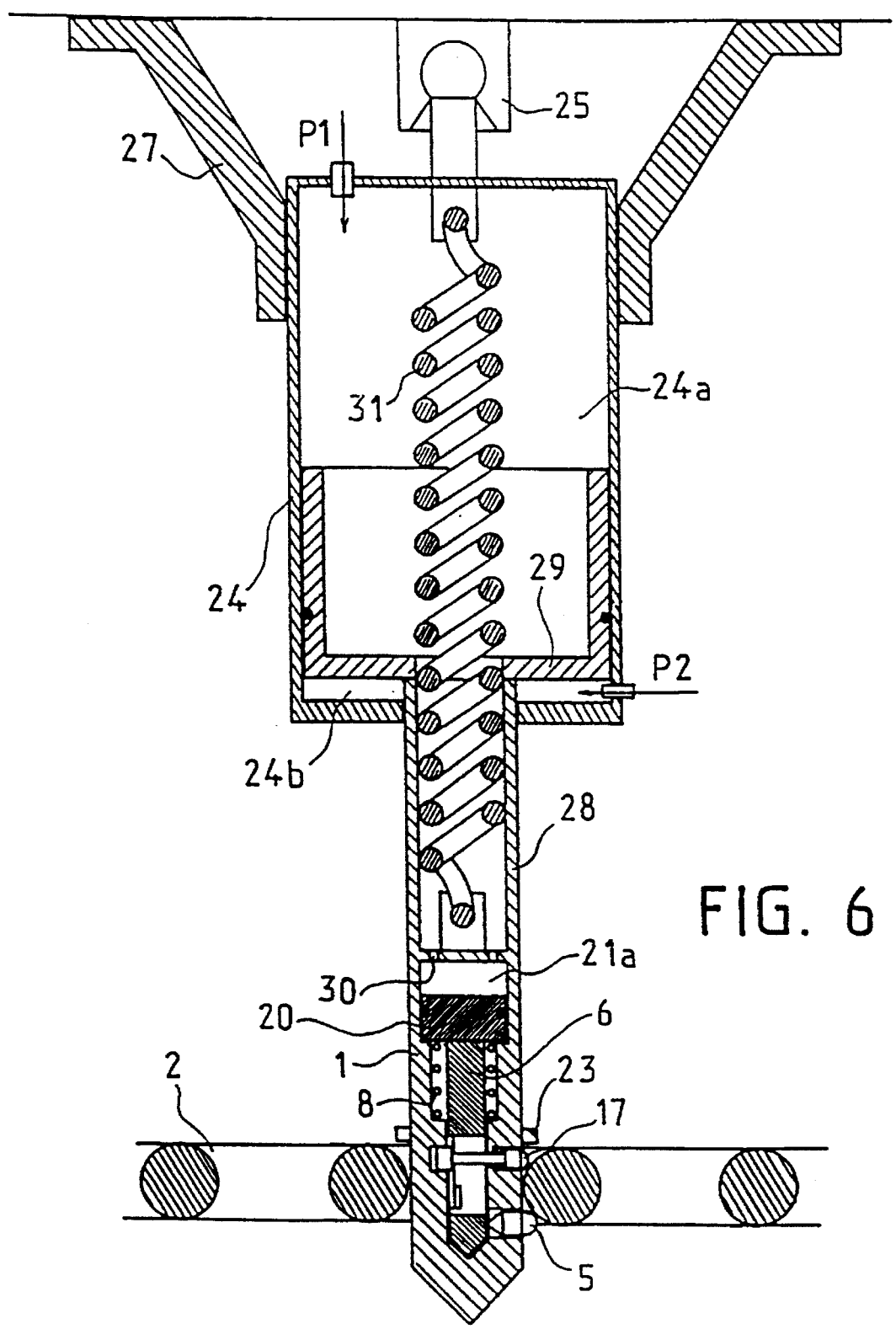

The catching head according to the invention takes the form of a cylindrical shaft 1, the lower end 1a of which is convex, preferentially conical, to facilitate its penetration through the cells of a grid such as 2 in FIGS. 4 to 6. So that it can engage therein, even if its orientation is not strictly perpendicular to the grid, its diameter is slightly smaller than the minimum diameter of the cells.

Just above its conical end 1a, the shaft 1 has three fingers 5 engaged in radial holes 4, which open into an axial bore 3, at a certain distance above the lower end 3a of the bore.

The body of each of the fingers 5 has a cylindrical median part 5a, an inner terminal part 5b, which is conical in form, and an outer terminal part 5c, which is rounded in form. Between the parts 5a and 5b, a small peripheral shoulder, directed towards the outside, enables the median part 5a to be captured inside the hole 4, by forming an inner collar along the edge thereof. The fingers 5 are capable of sliding in the holes 4 between a retracted position, FIG. 1, in which the outer end 5c is located inside the hole 4, the inner end 5b being in the bore 3 and an extended position, FIG. 2, in which the outer end 5c projects at the periphery of the shaft 1, the inner end 5b being totally inside the hole 4.

An internal rod 6 is mounted in a sliding manner in the bore 3, the function of which is to move and maintain the fingers 5 in the extended position. To this end, its lower end 6a is conical in form. In the top position, the rod 6 has its end 6a above the internal ends 5b of the fingers 5, which can therefore penetrate freely into the bore 3. When it descends, the rod 6 drives the fingers 5 towards the outside, and maintains them extended by means of its cylindrical surface blocking the holes 4.

The rod 6 is integral with a manoeuvring arm 7 extending from the shaft 1 via a plug 9 closing the bore 3. Around the part of the arm 7 inside the bore, between the plug 9 and the top of the rod 6, a spring 8 forces the rod 6 towards the bottom, or towards its position for locking the fingers 5 in the extended position. The descent of the rod 6 is limited by a stop on the plug 9 of a pull cable 10 fixed to the outer end of the arm 7. The pull cable 10 is also used to control the rising of the rod 6 into the bore 3.

The shaft 1 also has a trigger system for retaining the rod 6 in the top position in the bore 3, against the force of the spring 8 and for releasing it in response to the engagement in a grid cell, after the three fingers 5 have passed, toward the bottom, the plane of smallest diameter between the isthmuses delimiting the cell.

Figure 3:
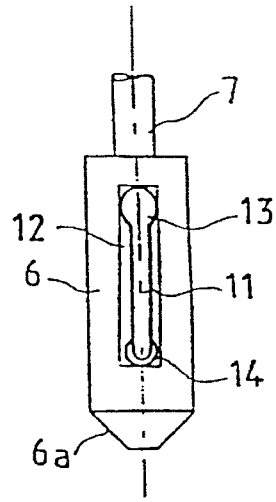
FIG. 3 is a diagrammatic front view of a part controlling the return and extension of the fingers.

The trigger system includes, on the one hand, in the rod 6, a hole 11, longitudinally elongated and passing through the rod 6 diametrically, as can be seen in FIG. 3. On one side, around the hole 11, the peripheral surface of the rod 6 has an offset 12 in the form of a flattened surface. Moreover, the top of the hole 11 widens into a cylindrical part 13, while its base, on the side of the flattened surface 12, has a spot face 14.

The system includes, on the other hand, a transverse rod 15 passing via the hole 11. On the side of the offset 12, the end 15a of the rod 15 has a circular shoulder resting on the edge of the hole 11, the shoulder being slightly smaller in diameter than the spot face 14 and the cylindrical part 13. The end 15a is engaged in a sliding manner in a blind hole 16 produced from the bore 3 in the body of the shaft 1.

The other end of the rod 15 is integral with a dog 17 engaged in a hole 18 opening at the periphery of the body of the shaft 1. The dog 17 has an inner cylindrical part sliding in the hole 18 and an outer rounded part. It is moved towards the outside by a spring 19 and constitutes the release device of the trigger system.

The cylindrical part 13 of the hole 11 is used only for assembling the system, enabling the widened end 15a of the rod 15 to be passed through the hole 11.

Figure 2:
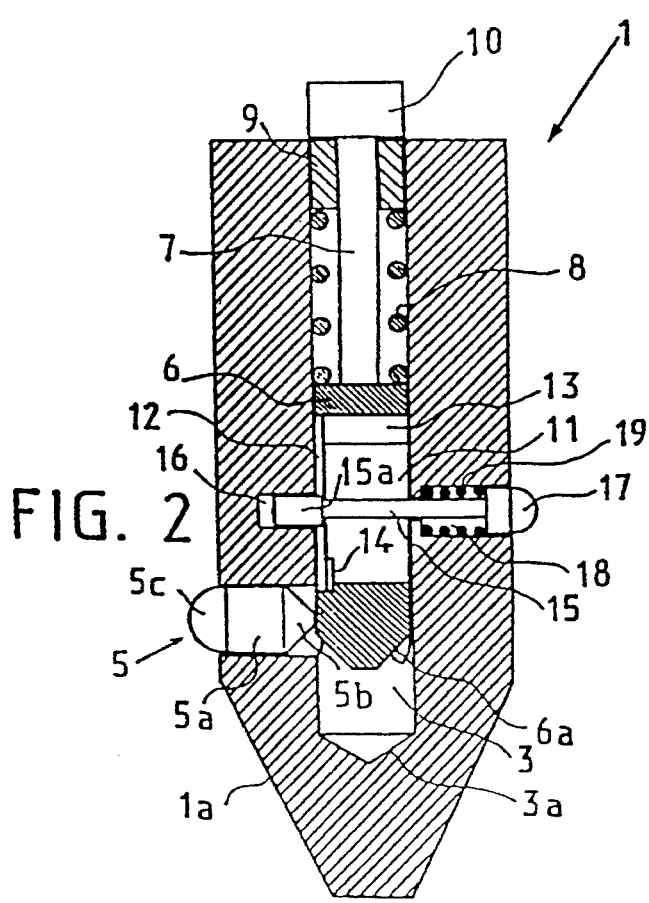

It can be seen in FIG. 1 that the rod 6 for locking the fingers 5 is maintained in the top position, against the spring 8, by the engagement of the end 15a of the rod 15 in the spot face 14. The dog 17 then leaves the body of the shaft 1 by a distance such that the sum of this distance and of the diameter of the shaft 1 is greater than the minimum diameter of a cell.

FIGS. 4a to 4c illustrate, in diagram form, the operation of such a catching head. In FIG. 4a, the shaft 1 descends vertically towards the grid 2. The rod 6 is retained in the top position by the trigger system, against the spring 8. The fingers 5 are in the retracted position inside the body of the shaft.

On contact with the grid 2, the shaft 1 is guided by its end 1a into a cell of the grid 2, optionally assuming a slightly oblique position with respect thereto. While the shaft 1 continues to descend, its fingers 5 pass under the level of the smallest diameter of the cell, before the dog comes into contact with the grid.

When this contact takes place, FIG. 4b, the released rod 6 descends, via the action of the spring 8, driving the fingers 5 towards the outside. It should be noted that the system for extending the fingers 5 is such that if they are blocked on activation of the trigger system, this has no detrimental effect for the parts of the device, the rod 6 simply remaining retained by the internal ends 5b of the fingers 5. Locking is nevertheless ensured even if the fingers are unlocked. On the other hand, the locking of the fingers 5 is absolutely reliable for as long as the rod 6 remains in the locking position.

FIG. 4c illustrates the phase in which, the shaft 1 having continued to descend into the cell, the dog 17 is no longer in contact with the grid 2. The rod 15, which is integral with the dog 17 in the trigger system, is returned by the spring 19, such that the shoulder of its end 15a rests on the flattened part of the rod 6 around the hole 11, in the offset 12. Since the fingers 5 are locked in the extended position by the rod 6, the shaft 1 is anchored in a stable manner in the grid 2. If the shaft 1 is raised, the fingers 5 keep it captured in the cell by pressing under its edges. If the force exerted towards the top on the shaft 1 is significant, it is sensible to check beforehand that its orientation is indeed perpendicular to the grid 2, so that the force is correctly distributed between the three fingers 5.

The catching head described above is entirely mechanical, and is thus easily installed on very simple harpoons, since, for its operation, it requires no external means other than a means for exerting traction on the pull cable 10, in order to reset it.

In the other embodiments illustrated in FIG. 5 and the following, pneumatic means are combined with mechanical means. To this end, the rod 6 is integral, via its upper end, with a piston 20 that is movable in an axial bore 21.

In the shaft in FIGS. 5 and 6, the piston 20 is subjected to pressure from the top, in the chamber 21a, while it is returned to the top position by the spring 8. Consequently, the descent of the rod 6 into the position locking the fingers 5 is pneumatic, while its raising to the top position is mechanical.

Figure 8:
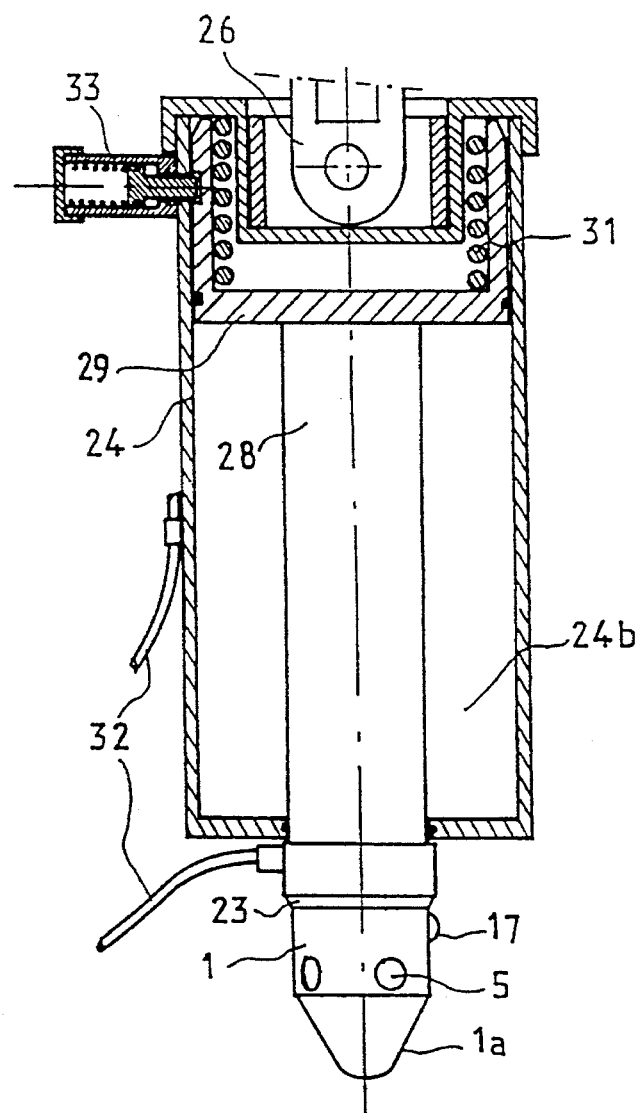
FIGS. 8 and 9 are diagrammatic views, in partial axial section, illustrating the state at rest of two embodiments of the harpoon having the second variant of the head shown in FIG. 7.
Figure 7:
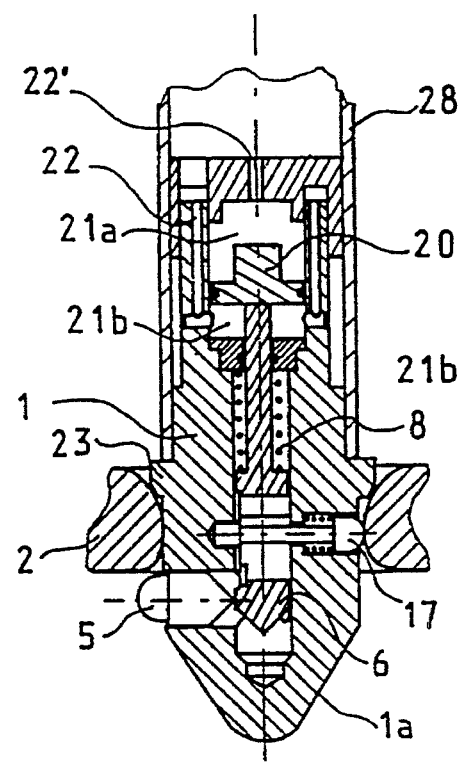
FIG. 7 is a view similar to FIG. 1 of a second variant of the catching head according to the invention.
Figure 9:
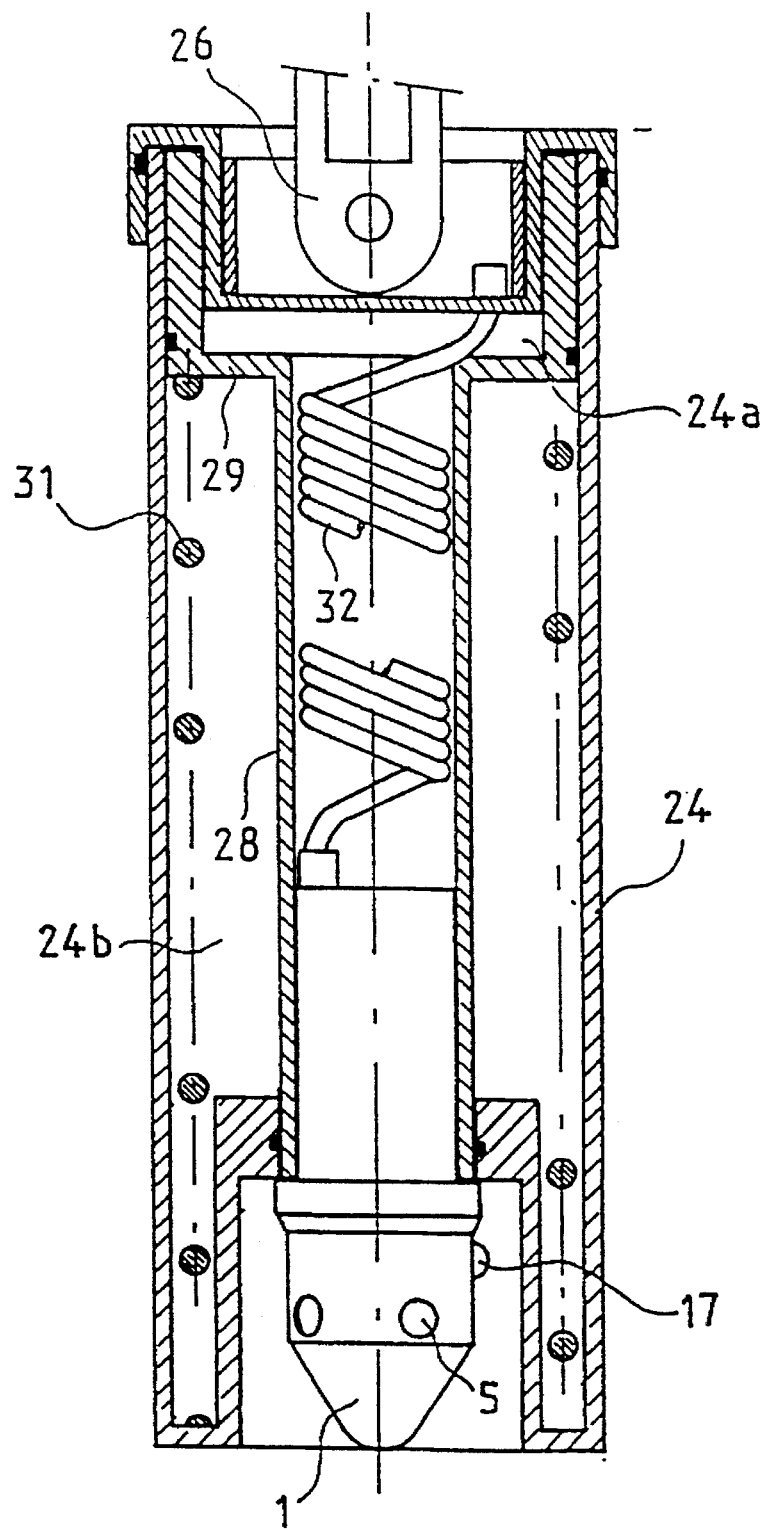

In FIGS. 7 to 9, the piston 20 is subjected to pressure on its lower face, the chamber 21b being pressurized via the passages 22, which are connectable to a compressed air source at the level of the upper end of the shaft 1, FIGS. 7 and 9, or on the side, FIG. 8. The upper chamber 21a of the bore 21 has a vent hole 22'. The spring 8 returns the piston 20 to the bottom position. In the shaft, the descent of the rod 6 into the position locking the fingers 5 is therefore mechanical, and its raising is pneumatic.

It can also be seen in FIGS. 5 to 9 that the shaft 1 is advantageously provided with a stop to limit its penetration into the grid 2, in the form of a collar or peripheral shoulder 23.

The light harpoon in FIGS. 5 and 6 was designed from a shaft 1 in which the descent of the rod 6 into the position locking the fingers 5 is pneumatic. The arm of the harpoon consists of a jack 24, which is fixed under the aircraft by a ball and socket joint 25 or, as a variant, by a universal joint 26, as shown in FIGS. 8 and 9. The universal joint 25 allows the use of the mounting for a load bearing hook equipping most helicopters. A flexible sleeve 27 protects the joint 25 or 26. In addition, it is used to return the jack 24 to the vertical position. The shaft 1 constitutes the lower part of the rod 28 of the jack 24. The rod 28 is hollow, such that the upper chamber 21a in the shaft 1 communicates, via the rod 28 and the piston 29, with the upper chamber 24a of the jack 24, by means of the passages 30.

On the other hand, the piston 29 is returned to the top position—retracted state of the jack 24 and therefore of the harpoon—by a spring 31.

In the at-rest state, FIG. 5, the jack 24 is maintained retracted by the spring 31, and the rod 6 is maintained in the top position in the shaft 1 by the trigger system.

The anchoring of the harpoon is controlled by pressurizing, to a pressure P1, the chamber 24a and, as a consequence, the lower chamber 21a of the bore 21. The jack 24 is extended and, concomitantly, since the trigger system is activated, the pressure in the chamber 21a exerts on the piston 20 a force greater than the opposite force of the spring 8, without causing the descent of the rod 6. Consequently, upon the passage of the shaft 1 into a cell of the grid 2, FIG. 6, the dog 17 activates the trigger system and the rod 6 descends into the shaft under the effect of the pressure P1, locking the fingers 5 in the extended position. Then, for the positioning of the aircraft, the harpoon can be tensioned by building up, in the chamber 24b of the jack 24, a pressure P2, which is greater than the pressure P1. Since the two chambers 24a, 24b are pressurized, the jack 24 also performs an advantageous damping role in the event of variations in stress on the harpoon.

For releasing the harpoon, the chamber 24b is first discharged, then the chamber 24a and, as a consequence, the chamber 21a. Under the action of the spring 8, the rod 6 rises into the shaft 1 such that the fingers 5 are unlocked, enabling the rising of the shaft 1, out of the grid 2, by the retraction of the jack 24, which is provided by the spring 31. In the bore 3, the rod 6 rises until the trigger system is reset, such that the harpoon is ready for a new operating cycle.

The harpoon of FIG. 8 essentially comprises the same elements as the one in FIGS. 5 and 6, and will not therefore be described in detail. It has a shaft 1 of the same type as that in FIG. 7, namely that the extension and the locking of the fingers 5 are mechanical, and the raising of the rod 6 is pneumatic.

The shaft 1 is linked to a compressed air source by an outer flexible tube 32. The jack 24 itself is strictly single-action, i.e. only the lower chamber 24b can be pressurized, in order to ensure its retraction and the positioning function. It is extended by the spring 31, the piston being retained in the top position by an automatically-activated pneumatic lock 33.

This harpoon has the advantage of requiring very little external energy at the time of catching, the external energy only being required for activating the lock 33. In fact, the extension of the arm and the catching of the shaft in the grid result from the action of the springs 8 and 31. As with the one shown in FIGS. 5 and 6, the harpoon performs the positioning function by pressurization of the chamber 24b.

To release it, it is necessary, as applicable, to release the pressure in the chamber 24b, then to establish pressure in the chamber 21b, by means of the piston 20 via the flexible tube 32. The rod 6 rises into the bore 3, unlocking the fingers 5. By repressurizing the chamber 24b, the jack 24 is retracted, compressing the spring 31. Once the head 1 has left the grid 2, the pressure can be released into the chamber 21b, the rod 6 being retained in the top position by the trigger system.

In relation to the harpoon in FIG. 8, the harpoon in FIG. 9 differs in function only in that the jack 24 is extended by pneumatic means, by pressurizing the upper chamber 24a and is retracted mechanically, by the action of the spring 31, which is fitted between the base of the lower chamber 24b and the underneath of the piston 29. The flexible tube 32 linking the shaft 1 to the compressed air source passes inside the rod 28 and the chamber 24a of the jack 24.

For catching the harpoon, the chamber 24a is pressurized such that the jack 24 is extended. On penetration of the shaft into the cell, the fingers 5 are locked by the descent of the rod 6 under the action of the spring 8, FIG. 7. The chamber 24a can then be discharged. As with the harpoons described above, the positioning function is obtained by pressuring the chamber 24b.

For releasing, the pressure is first released in the chamber 24b, then the pressure is built up in the chamber 21b of the shaft, the effect of which is to release the fingers 5 by the raising of the rod 6. The jack 24 is then retracted under the action of the spring 31, by discharging of the chamber 24a if the pressure has been maintained therein, and the chamber 21b can also be discharged as soon as the shaft 1 has left the grid.

We claim:

1. A harpoon cooperating with a grid for a vertical takeoff and landing aircraft comprising:

a connecting arm having a head with a convex end;

fingers oriented and movable radially between a retracted position inside radial holes of said head and an extended position;

a rod slidable in an axial bore of the head, said rod urging said fingers to the extended position while descending into the bore and releasing said fingers while rising in the bore, wherein rod descent is effected in response to penetration of the head into a cell of the grid after said fingers pass beyond a level of a smallest diameter of the cell;

a spring urging said rod one of downward and upward;

pneumatic means for urging said rod the other of downward and upward; and means for rearming said rod, wherein said connecting arm comprises a jack having a first piston, said head being attached to said first piston, wherein said rod is attached to a second piston communicating with said first piston and said rod and movable in an area contiguous with said bore.

2. A harpoon according to claim 1, wherein said head comprises a peripheral collar limiting penetration of said head into the grid.

3. A harpoon according to claim 1, wherein arming of said rod is provided by a trigger system that is released by a tripping device located above said fingers and sensitive to passage of the grid in a cell.

4. A harpoon according to claim 1, wherein in the shaft, ascent of the rod in the bore is mechanical, and descent of the rod is pneumatic, the rod being integral with a piston movable in a bore, an upper chamber of which communicates with an upper chamber of the jack, extension of the jack being controlled by pressurization of the chamber and, releasing and retraction of the harpoon being controlled by releasing the pressure, the spring effecting raising of the rod into the bore, and a piston spring effecting the raising of the piston into the jack.

5. A harpoon according to claim 1, wherein in the shaft, descent of the rod in the bore is mechanical, and raising of the rod is pneumatic, the rod being integral with a piston movable in a bore, a lower chamber of said bore communicating with a compressed air source via a flexible tube.

6. A harpoon according to claim 5, wherein the jack is extended by a spring and is retracted by pressurization of the lower chamber, the retracted state being maintained by means of a lock.

7. A harpoon according to claim 5, wherein the jack is extended by pressurization of the upper chamber and is retracted by the action of a spring.

8. A harpoon according to claim 6, wherein in a catching position, it is tensioned by pressurization of the lower chamber of the jack.

* * * * *